United States Patent
Langan et al.

(10) Patent No.: US 11,656,008 B2
(45) Date of Patent: May 23, 2023

(54) HEAT PUMP UTILISING THE SHAPE MEMORY EFFECT

(71) Applicant: EXERGYN LTD., Glasnevin (IE)

(72) Inventors: Michael Langan, Glasnevin (IE); Kevin O'Toole, Glasnevin (IE)

(73) Assignee: EXERGYN LTD., Glasnevin (IE)

( * ) Notice: Subject to any disclaimer, the term of this patent is extended or adjusted under 35 U.S.C. 154(b) by 219 days.

(21) Appl. No.: 16/966,296

(22) PCT Filed: Jan. 30, 2019

(86) PCT No.: PCT/EP2019/052300
§ 371 (c)(1),
(2) Date: Jul. 30, 2020

(87) PCT Pub. No.: WO2019/149783
PCT Pub. Date: Aug. 8, 2019

(65) Prior Publication Data
US 2020/0370796 A1 Nov. 26, 2020

(30) Foreign Application Priority Data

Jan. 30, 2018 (GB) .................................... 1801534

(51) Int. Cl.
| | |
|---|---|
| *F25B 30/04* | (2006.01) |
| *F25B 29/00* | (2006.01) |
| *F25B 37/00* | (2006.01) |
| *F03G 7/06* | (2006.01) |

(52) U.S. Cl.
CPC .............. *F25B 30/04* (2013.01); *F03G 7/065* (2013.01); *F25B 29/006* (2013.01); *F25B 37/00* (2013.01)

(58) Field of Classification Search
CPC ......... F03G 7/065; F25B 30/04; F25B 29/006
See application file for complete search history.

(56) References Cited

U.S. PATENT DOCUMENTS

| | | | | |
|---|---|---|---|---|
| 2013/0319028 | A1* | 12/2013 | Tsubouchi | ......... B60H 1/32011 62/238.3 |
| 2015/0159923 | A1* | 6/2015 | Akisawa | .................. F25B 30/04 62/324.6 |
| 2015/0377525 | A1* | 12/2015 | Hirota | ...................... F25B 17/08 62/324.2 |
| 2016/0084544 | A1 | 3/2016 | Radermacher et al. | |
| 2018/0259232 | A1* | 9/2018 | Sakuma | .................. F25B 49/02 |
| 2018/0283742 | A1* | 10/2018 | Radermacher | .......... F25B 23/00 |

(Continued)

FOREIGN PATENT DOCUMENTS

| | | |
|---|---|---|
| DE | 102015121657 A1 | 6/2017 |
| DE | 102016100596 A1 | 6/2017 |
| WO | 2014198927 A1 | 12/2014 |

*Primary Examiner* — Nelson J Nieves
(74) *Attorney, Agent, or Firm* — Nixon Peabody LLP; David S. Resnick; David F. Crosby

(57) ABSTRACT

The invention provides a heat pump system and method comprising a Shape-Memory Alloy (SMA) or Negative Thermal Expansion (NTE) core (2a, 2b) positioned in a housing and adapted to absorb heat and store energy in response to a first fluid inputted at a first temperature. The housing is configured to receive a second fluid via an inlet wherein a device changes pressure in the housing to cause the SMA or NTE core to change state to release the heat absorbed into the second fluid. An outlet is adapted to output the second fluid at a higher temperature than the first temperature.

5 Claims, 3 Drawing Sheets

(56) References Cited

U.S. PATENT DOCUMENTS

2019/0032969 A1\* 1/2019 Bartholome .......... F03G 7/0646
2019/0353355 A1\* 11/2019 Garrabrant ................ F24D 5/12
2020/0127305 A1\* 4/2020 Fuse ................ H01M 8/04007
2021/0071919 A1\* 3/2021 Wuest ..................... F25B 23/00

\* cited by examiner

HEAT PUMP UTILISING THE SHAPE MEMORY EFFECT

CROSS-REFERENCE TO RELATED APPLICATIONS

This application is a 35 U.S.C. § 371 National Phase Entry Application of International Application No. PCT/EP2019/052300 filed 30 Jan. 2019, which designates the U.S. and claims benefit under 35 U.S.C. § 119(a) of GB Provisional Application No. GB1801534.7 filed 30 Jan. 2018, the contents of which are incorporated herein by reference in their entireties.

FIELD

This disclosure relates to a heat pump. In particular this disclosure relates to a heat pump for heating systems and/or cooling systems such as an air conditioning system.

BACKGROUND

Heat Pump ("HP") technologies have gained wide commercial acceptance in heating, ventilation & air conditioning ("HVAC") applications. They can offer energy savings and emissions reductions and are typically installed for heating and cooling systems in buildings or car applications etc.

There are several types of heat pump. Most existing technologies utilise an expansion/compression cycles, many heat pumps are classified by the source of the heat e.g. air source heat pump or ground source heat pump. The fundamental technology used in the heat pump is similar. Air source heat pumps have limited performance in cold temperature (at −18° C., CoP tends to be around 1 (due to Carnot) so electrical resistance heating is more effective, at higher operating temperatures the CoP can reach 4). Ground Source heat pumps have more stable inlet temperature but are limited by the Coefficient of Performance ("CoP") of present technology.

There is a global need to decarbonise heating and cooling in buildings. Heating generally uses combustion of carbon-based fuel, which releases carbon into the atmosphere. Cooling and air conditioning can be a major electrical load in warmer climates. It can potentially deliver heating and cooling from a single package. If it uses renewable electricity, then it can be a zero-emission technology. Current heat pump technologies generally use refrigerants with high global warming potential and can have high toxicity, which is undesirable. Fans and pumps have a noise signature which can be intrusive. Current HP technology has a CoP of 3 to 4. By increasing the CoP, electricity consumption can be reduced, this reduces carbon emissions if non-renewable electricity is used. Moreover, conventional HP technologies can have a CoP which is affected by ambient air temperature which is undesirable. US Patent publication number US20160084544, Radermacher et al, discloses a heat pump system that uses SMA material tubes, where the are filled with other tubes or rods of an unknown material to take up volume and to therefore remove dead thermal mass to help boost he efficiency of the system. However, a problem with this configuration is that they are thermally inefficient and do not expand and/or contract uniformly. Moreover, the tubes suffer from buckling during use. US Patent publication number US20120273158, Cui et al, discloses a system that twists a bundle of SMA wires to release heat. This system is also not efficient and suffers from buckling during operation. German Patent publication numbers DE102016100596 and DE10215121657, assigned to Fraunhofer, describes a general system using a SMA material to release heat in a heat system.

It is therefore an object to produce a heat pump system that produces a large increase in Coefficient of Performance (CoP). It is another object to provided an improved cooling system.

SUMMARY

According to the invention there is provided, as set out in the appended claims, heat pump system comprising
 a Shape-Memory Alloy (SMA) or Negative Thermal Expansion (NTE) core positioned in a housing and adapted to absorb heat and store energy in response to a first fluid inputted at a first temperature, wherein the SMA or NTE core comprises a plurality of elements or wires arranged substantially in parallel to define the core;
 the housing is configured to receive the same fluid or a second fluid via an inlet wherein a device changes stress on the SMA or NTE core in the housing to cause the SMA or NTE core to change state to release the heat absorbed into the fluid; and
 an outlet adapted to output the fluid either at a higher temperature or lower temperature relative to the first or second fluid temperature depending on whether heat has been released or absorption by the SMA or NTE core.

The problem that is solved by the present invention is a heat pump that can exhibit a substantially higher CoP than any other prior art heat pump system. CoPs of six or higher can be achieved. Also the invention does not contain any hazardous fluids or materials with high global warming potential. The invention can provide one or more of the following advantages or features:
 The fluid may be moving or static during the heat absorption and heat release phases
 A cascade of stages may be used to increase the temperature change (with wires operating over different temperature ranges) or with flow rate
 Alternative transmission technologies may be used (mechanical, electrical, etc.)
 Use of SMA/NTE material for heat pump utilising latent heat from the phase change of the material
 A recovery pump for low load recycling of energy to drive the input motor that pushes from low to high-pressure.

In one embodiment the device utilises a high-pressure accumulator adapted to provide a stress to the material to enable a forward or a reverse phase change to occur in the core.

In one embodiment the SMA or NTE core comprises a plurality of elongated wires arranged substantially in parallel to define a core.

In one embodiment a hydraulic chamber is configured to physically elongate or stretch at least one wire of the core in response to stress from pressure supplied by the accumulator.

In one embodiment low-pressure in the hydraulic chamber is transferred to the SMA in the core chamber in order to allow a cycle for the core to absorb heat.

In one embodiment a hydraulic motor configured to raise the stress on the SMA via an increase in the pressure of the accumulator.

In one embodiment a low-pressure accumulator configured to reduce stress on the SMA in the housing when the fluid is being inputted at an initial temperature.

In one embodiment a pump is utilised to pump a hydraulic fluid from the low-pressure accumulator to a high-pressure accumulator.

In one embodiment a plurality of a SMA or NTE cores arranged in cascade arrangement in the system and arranged to increase the temperature difference.

In one embodiment flow rates of the fluid are controlled by a controller to adjust temperature change of the cycle.

In a further embodiment there is provided a heat pump method comprising the steps of:
- positioning a SMA or NTE core in a housing and adapted to absorb heat and store energy in response to a first fluid inputted at a first temperature;
- receiving the same fluid or a second fluid via an inlet in the housing wherein a device changes stress on the SMA or NTE component in the housing to cause the SMA or NTE core to change state to release the heat absorbed into the fluid; and
- outputting the fluid either at a higher temperature or lower temperature depending on whether heat has been released or absorption by the SMA or NTE component.

In another embodiment there is provided heat pump system comprising
- a Shape-Memory Alloy (SMA) or Negative Thermal Expansion (NTE) core positioned in a housing and adapted to absorb heat and store energy in response to a first fluid inputted at a first temperature;
- the housing is configured to receive a second fluid via an inlet wherein a device changes pressure in the housing to cause the SMA or NTE core to change state to release the heat absorbed into the second fluid; and
- an outlet adapted to output the second fluid at a higher temperature than the first temperature.

In a further embodiment there is provided a cooling system comprising
- a Shape-Memory Alloy (SMA) or Negative Thermal Expansion (NTE) core positioned in a housing and adapted to absorb heat and store energy in response to a first fluid inputted at a first temperature, wherein the SMA or NTE core comprises a plurality of elements or wires arranged substantially in parallel to define the core;
- the housing is configured to receive the same fluid or a second fluid via an inlet wherein a device changes stress on the SMA or NTE core in the housing to cause the SMA or NTE core to change state to release the heat absorbed into the fluid; and
- an outlet adapted to output the fluid either at a lower temperature relative to the first or second fluid temperature depending on whether heat has been released or absorption by the SMA or NTE core.

In another embodiment there is provided a cooling method, for example in a refrigerant system, the method comprising the steps of:
- positioning a Shape-Memory Alloy (SMA) or Negative Thermal Expansion (NTE) core in a housing and absorb heat and store energy in response to a first fluid inputted at a first temperature wherein the SMA or NTE core comprises a plurality of elements or wires arranged substantially in parallel to define a core;
- receiving the same fluid or a second fluid via an inlet in the housing wherein a device changes stress on the SMA or NTE core in the housing to cause the SMA or NTE core to change state to release the heat absorbed into the fluid; and
- outputting the fluid either at a higher temperature or lower temperature relative to the first or second fluid temperature depending on whether heat has been released or absorption by the SMA or NTE core

BRIEF DESCRIPTION OF THE DRAWINGS

The invention will be more clearly understood from the following description of an embodiment thereof, given by way of example only, with reference to the accompanying drawings, in which:—

DETAILED DESCRIPTION OF THE DRAWINGS

Figure 1:
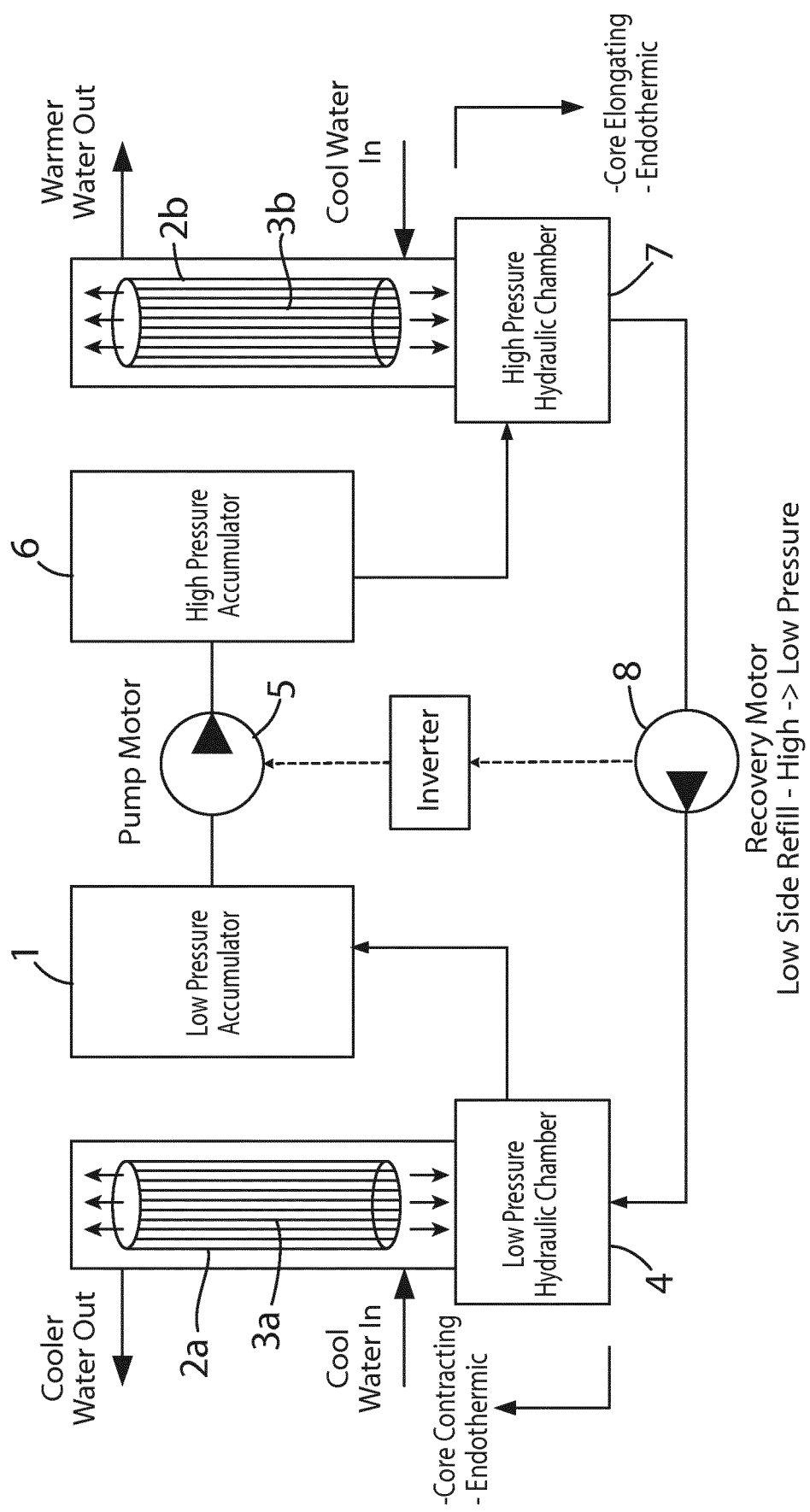
FIG. 1 illustrates an embodiment of the invention with a Heat Pump system incorporating a mechanical configuration of SMA or NTE cores and a transmission system.

The invention relates to a new heat pump cycle which utilises the latent heat from a phase transformation of shape memory alloys ("SMA") or Negative Thermal Expansion materials (NTE). The invention can use a particular SMA engine made up of a plurality of elements or wires packed closely together to define a core. SMA material can exist in two crystalline states, martensite and austenite, and can be reversibly converted from one phase to the other. The austenite to martensite transition of SMA is exothermic. The martensite to austenite transition is endothermic. The temperatures at which the phase change occurs can be manipulated via the application of stress to the SMA material.

A Shape-memory Alloy (SMA) is an alloy that exhibits a shape memory effect which once deformed returns to its pre-deformed shape upon heating. This material is a lightweight, solid-state alternative to conventional actuators such as hydraulic, pneumatic, and motor-based systems.

The memory of such materials has been employed or proposed for use in heat recovery processes and in particular by constructing SMA engines which recover energy from heat as motion. Recent publications relating to energy recovery devices include PCT Patent Publication number WO2013/087490, assigned to the assignee of the present invention, and incorporated fully herein by reference.

The invention relates to a heat pump system and method which can use either Shape-Memory Alloys (SMAs) or Negative Thermal Expansion materials (NTE) using a particular SMA engine made up of a plurality of elements or wires packed closely together to define a core. A heat pump has two individual phases—heat absorption and heat release. The machine cycle is defined as a full heat absorption phase (endothermic) and a full heat release phase (exothermic).

The heat absorption phase allows for the transfer of heat into the SMA material by setting the stress applied to the material to an appropriate value, the lower value used in the cycle of operation. This results in the activation temperatures, Austenite start ($A_s$) and Austenite finish ($A_f$), being set to a value below the input temperature of fluid stream. The thermal gradient present therefore allows the heat to transfer into the SMA via conduction and convection. Once the material has fully or partially transformed to austenite (i.e. the temperature of the SMA material is above $A_f$), the heat absorption phase is complete.

The heat release phase begins after increasing the stress on the austenitic SMA material. This raises the activation temperatures, Martensite start ($M_s$) and Martensite finish ($M_f$), for the reverse transformation back to martensite. Once the value of $M_s$ is raised above the input fluid stream temperature, the reverse transformation begins. It will only complete in full when Mt also raised above the fluid stream temperature. The latent heat is then released by the SMA material and into the fluid stream, raising its temperature. The rate at which the release of heat occurs is a function of the thermal gradient and various thermodynamic conditions of the fluid stream, such as flow rate, turbulence etc.

A single fluid temperature input can be used in the system, and a series of valves can be used at the output of the chamber to direct the colder fluid flow from the heat absorption phase back to source, while directing the warmer fluid from the heat release phase to the heating target. Multiple working fluid temperature inputs can also be used.

EXAMPLE EMBODIMENT

Figure 2:
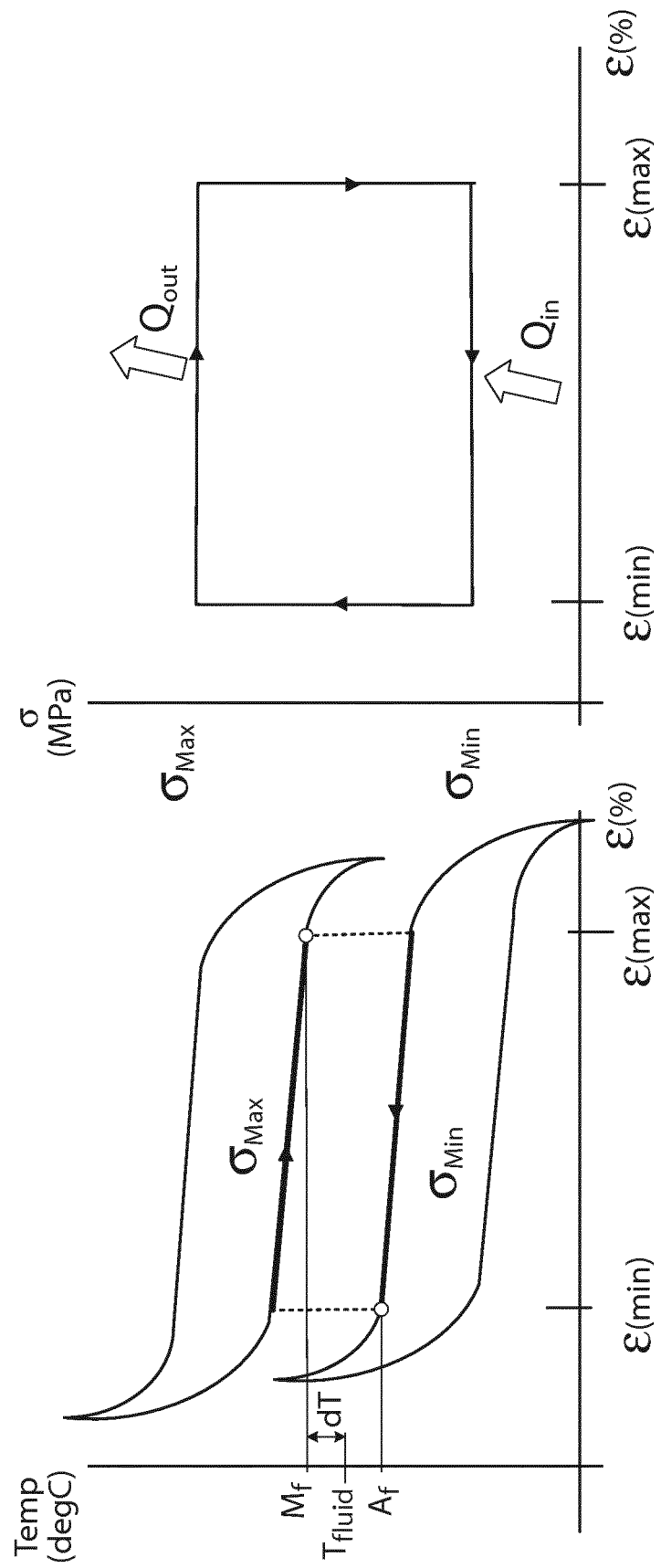
FIG. 2 illustrates a work flow diagram showing different states of the heat pump during operation.

FIG. 1 illustrates a Heat Pump system incorporating an SMA drive engine according to one embodiment of the invention. The engine is in the form of a SMA or a NTE core which comprises a plurality of elements or wires arranged substantially in parallel to define a core. FIG. 2 illustrates a work flow diagram showing different states of the SMA drive during operation.

With respect to FIGS. 1 and 2 the step-by-step process of the heat pump system in operation is now outlined in detail.

As shown in FIG. 1 a low-pressure accumulator pressure 1 is applied to a SMA core 2a or bundle in a martensite state. Fluid is input into a chamber housing the SMA core 2a which is at a higher temperature than the $A_s$ and $A_f$, therefore allowing the SMA material to absorb the heat. In a preferred embodiment the SMA core 2a comprises mechanically interlocked SMA elements or wires 3a arranged in bundles, where each wire 3a in the bundle acts to supports other against buckling due to the tight assembly arrangement. The fluid in the present case travels externally over the wires 3a as is transits through the bundle. This is fundamentally important as it maximises surface, and therefore heat transfer area. The wires are mechanically interlocked with each other to aid power density and resistance to buckling. The wires are densely packed bundles of wires/rods which will significantly improve efficiency such that the wires are actuated in a vertical plane when the wires are arranged in a vertical position as shown. The system shown in FIG. 1 effectively provides a closed loop heat pump system.

As a result of a low-pressure applied (and hence low stress) on the wires, both the Austenite start ($A_s$) and Austenite finish ($A_f$) temperatures are lowered proportionally, making a full martensite to austenite transformation easier to achieve with the lower input fluid temperature. The SMA wires in the core are heated to point $A_f$, as shown in FIG. 2. $A_f$ is the point of maximum contraction of the wire by design—representing a partial or full martensite to austenite transformation.

During this endothermic transformation, the wire, or wires making up the core, absorbs a substantial quantity of latent heat from the input fluid stream. The contracting wires pump low-pressure hydraulic fluid out of a hydraulic chamber 4 into the low-pressure accumulator 1.

A pump 5 is utilised to pump the hydraulic fluid from the low-pressure accumulator 1 to a high-pressure accumulator 6. The pump 5 can be sized according to the output power of the cores 2a, 2b plus the hydraulic transmission losses through the system from the accumulator to the core—this allows for enough pressure in the high-pressure accumulator 6 to provide enough pressure to the core 2b during the heat absorption phase of the cycle (endothermic).

The high-pressure accumulator 6 is applied to the cores 2a, 2b to achieve wire elongation via the release of latent heat. Effectively, the austenite to martensite transformation occurs. Input fluid (which can be the same temperature as the original input fluid) is input into the chamber which can now absorb the heat released from the SMA wires.

As a result of the high-pressure on the SMA wires, the activation temperatures for Martensite start ($M_s$) and Martensite finish ($M_f$) are raised proportionally above the fluid temperature. This allows a complete A to M transformation to occur, thus elongating the wire and releasing the heat into the fluid stream, increasing its internal energy and giving rise to an increase in temperature.

The SMA wire temperature in the core is brought to point $M_f$, as shown in FIG. 2. $M_f$ is the point of wire elongation by design—representing a partial or full reversal in the transformation from A to M.

The high-pressure in the hydraulic chamber 7 can physically tension the wires. This reaction is exothermic, and both the sensible heat and full or partial quantity of latent heat are released into the fluid stream, giving rise to an increase in temperature of the fluid. The high-pressure in the hydraulic chamber 7 must now be transferred to the low-pressure hydraulic chamber 4 in order to allow the cycle to restart.

It will be appreciated that the reactions described above happen in a non-antagonistic cycle, either sequential or in series. The fact that the system can recover mechanical energy in a decoupled manner using the hydraulic transmission rather than through a direct coupling is technically advantageous. The system releases latent heat, which heats the wires sensibly, with this being immersed in fluid, then heats the fluid bringing the SMA/heat transfer fluid to a state approaching equilibrium. In effect the wire is technically acting a heat storage unit which can be used as a heater when a change in state occurs.

As there is a pressure differential and flow rate available, a motor 8 can be used to drop the pressure, while converting the power into usable electricity to drive the pumping motor via an electric inverter (a recovery motor). This recovers energy that would otherwise be wasted in the cycle and is used to increase the CoP of the system.

To account for any differences between the heat absorption time and heat release time, an additional set of redundant cores can be used so that the heat absorption time is doubled, or the heat release time is doubled—whichever is slower in any embodiment.

Figure 3:
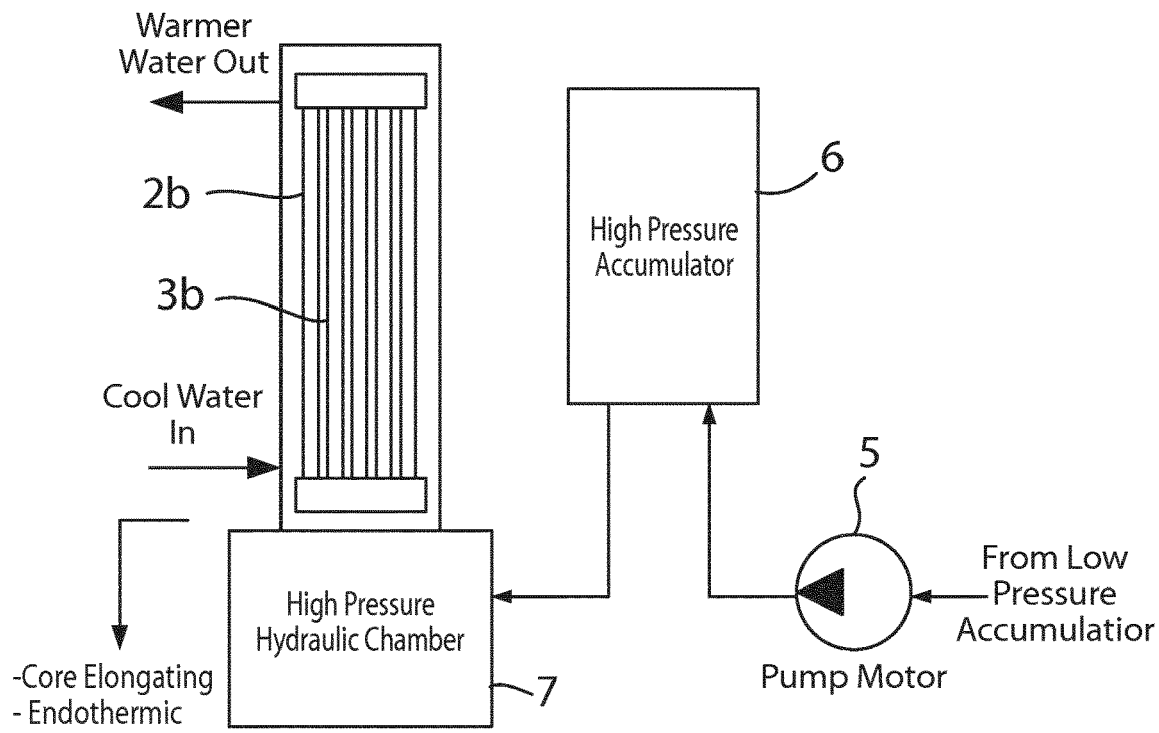
FIG. 3 illustrates a single SMA or NTE core for using in a High Pressure (HP) cycle according to one embodiment of the invention.

FIG. 3 illustrates a single SMA or NTE core for using in a High Pressure (HP) cycle according to one embodiment of the invention and uses the same reference numerals as FIG. 1. FIG. 3 shows a heater pump system where cool water enters the chamber and warm water exist due to a change in state of the core 2b. In effect the system can be used as an effective heat pump using a single core only.

Figure 4:
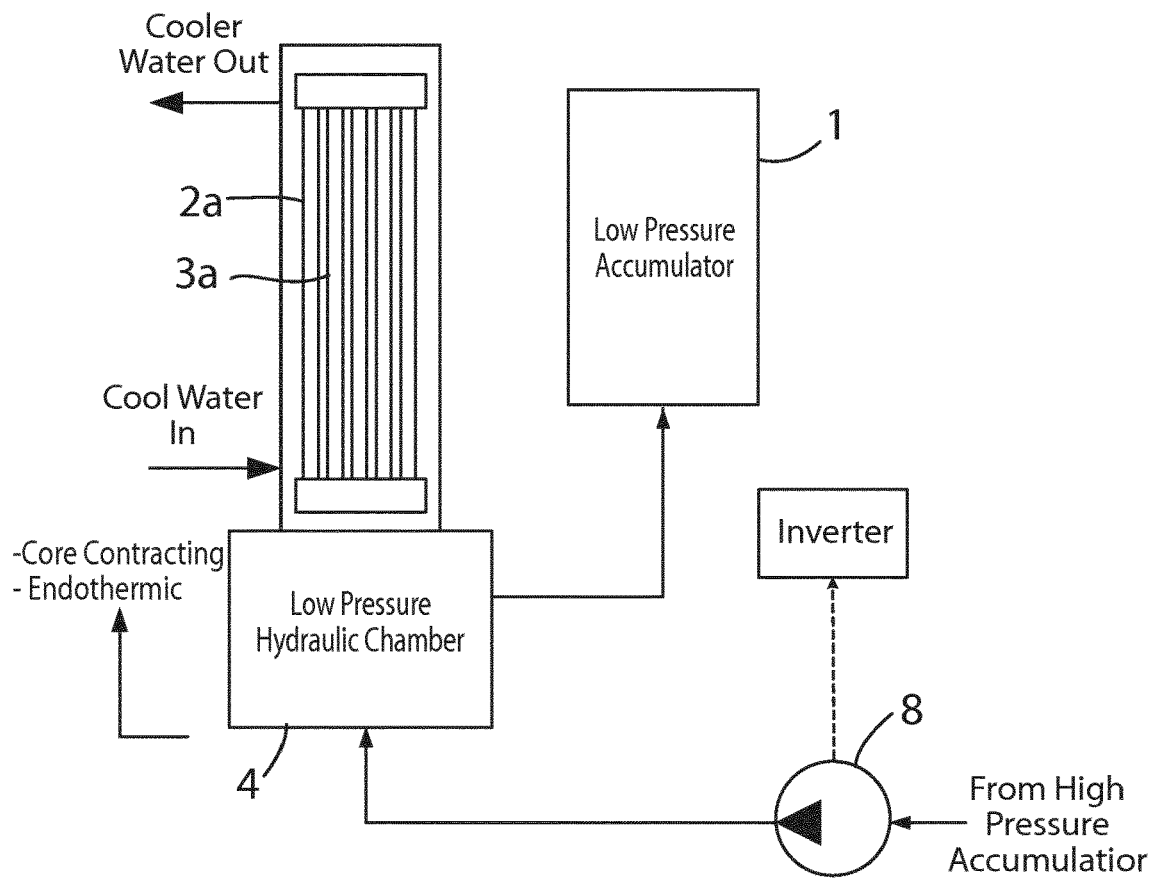
FIG. 4 illustrates a single SMA or NTE core for using in a Low Pressure (LP) cycle according to one embodiment of the invention.

FIG. 4 illustrates a single SMA or NTE core for using in a Low Pressure (LP) cycle according to one embodiment of the invention and uses the same reference numerals as FIG. 1. FIG. 4 shows a cooling system and works in reverse to FIG. 3. Low-pressure in the hydraulic chamber 4 is transferred to the SMA or NTE core 2a in the core chamber in order to allow a cycle for the core 2a to absorb heat. It will be appreciated that the invention can be applied to refrigeration systems where the system can operate in reverse and the outlet is adapted to output the second fluid at a lower temperature than the input temperature.

In the specification the terms "comprise, comprises, comprised and comprising" or any variation thereof and the terms include, includes, included and including" or any variation thereof are considered to be totally interchangeable and they should all be afforded the widest possible interpretation and vice versa.

The invention is not limited to the embodiments hereinbefore described but may be varied in both construction and detail.

The invention claimed is:

1. A heat pump system comprising
a Shape-Memory Alloy (SMA) or Negative Thermal Expansion (NTE) core positioned in a housing, and adapted to absorb heat and store energy in response to a first fluid inputted at a first temperature, wherein the SMA or NTE core comprises a plurality of elements to define the core;
the housing is configured to receive the same fluid or a second fluid via an inlet wherein a device changes stress on the SMA or NTE core in the housing to cause the SMA or NTE core to change state to release the heat absorbed into the fluid;
an outlet adapted to output the fluid either at a higher temperature or lower temperature relative to the first or second fluid temperature depending on whether heat has been released or absorbed by the SMA or NTE core;
a high-pressure accumulator adapted to provide a stress to the core to enable a forward or a reverse phase change to occur in the core; and
a low-pressure accumulator configured to reduce stress on the SMA or NTE core in the housing when the fluid is being inputted at an initial temperature; and
wherein a pump is utilised to pump a hydraulic fluid from the low-pressure accumulator to the high-pressure accumulator.

2. The heat pump system as claimed in claim 1 wherein a hydraulic chamber is configured to physically elongate or stretch at least one element or wire of the core in response to stress from pressure supplied by the accumulator.

3. The heat pump system as claimed in claim 2 wherein low-pressure in the hydraulic chamber is transferred to the SMA or NTE core in the housing in order to allow a cycle for the core to absorb heat.

4. The heat pump system as claimed in claim 1 comprising a hydraulic motor configured to raise the stress on the SMA or NTE core via an increase in a pressure of the high-pressure accumulator.

5. The heat pump system as claimed in claim 1 wherein flow rates of the fluid are controlled by a controller to adjust temperature difference of the cycle.

* * * * *